United States Patent [19]

Ujari

[11] Patent Number: 4,993,054
[45] Date of Patent: Feb. 12, 1991

[54] BRAZED X-RAY TUBE ANODE ASSEMBLY
[75] Inventor: Paul U. Ujari, Milwaukee, Wis.
[73] Assignee: General Electric Company, Milwaukee, Wis.
[21] Appl. No.: 413,423
[22] Filed: Sep. 27, 1989
[51] Int. Cl.$^5$ .................. H01J 35/24; B23K 20/00
[52] U.S. Cl. .................. 378/125; 378/121; 378/143; 378/144; 228/193; 228/263.11
[58] Field of Search .................. 378/121, 144, 143; 228/193, 263.19, 263.11, 263.13, 187

[56] References Cited
U.S. PATENT DOCUMENTS

| 3,778,654 | 12/1973 | Hueschen et al. | 378/144 |
| 4,073,426 | 2/1978 | Devine, Jr. | 378/144 |
| 4,497,430 | 2/1985 | Bose et al. | 228/263.11 |
| 4,497,772 | 2/1985 | Mizuhara | 228/263.11 |
| 4,736,400 | 4/1988 | Koller et al. | 378/144 |
| 4,866,748 | 9/1989 | Caraher et al. | 378/144 |

Primary Examiner—Edward P. Westin
Assistant Examiner—Kim-Kwok Chu
Attorney, Agent, or Firm—Quarles & Brady

[57] ABSTRACT

An improved rotary x-ray target wherein a rotor stud member is fastened to a hub portion, with both the stud member and the hub portion composed of a refractory metal. The fastening of the stud member to the hub portion is effected by a brazing alloy composed of the following ranges of metals expressed in weight percent: 30–70 copper; 10–55 palladium and 5–28 nickel. The brazed joint has a liquidus temperature in the range of 1145°–1200° C. and thus allows operating temperatures for the stud/hub joint of at least as high as 1000° C.

5 Claims, 2 Drawing Sheets

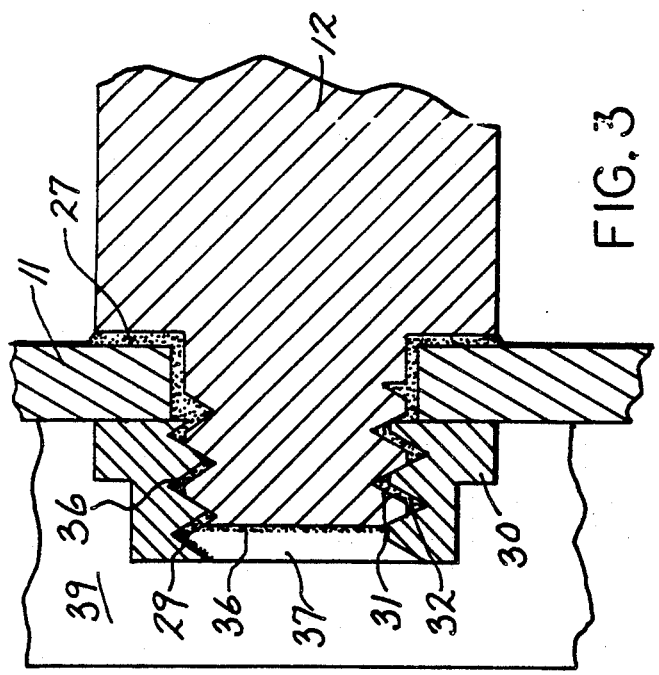
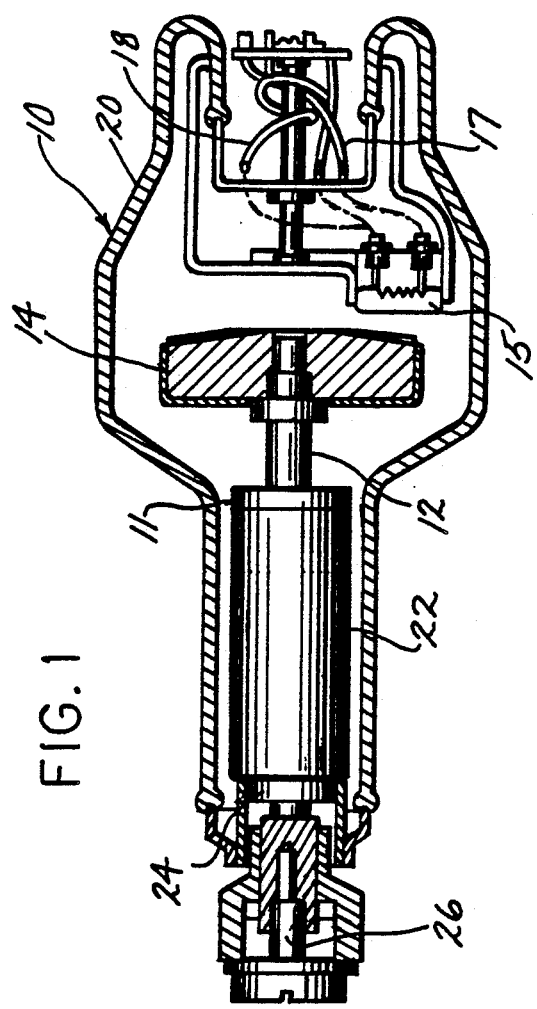
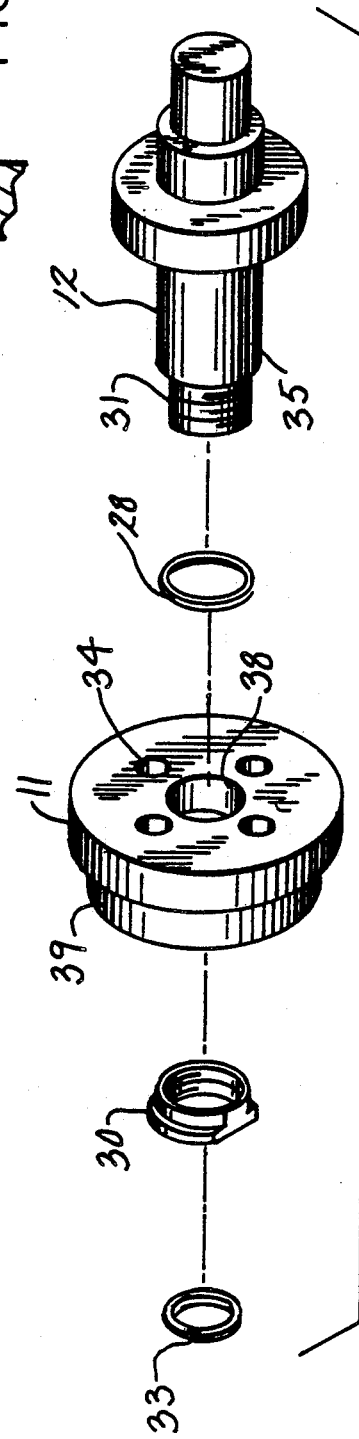

BRAZED X-RAY TUBE ANODE ASSEMBLY

BACKGROUND OF THE INVENTION

This invention relates to the joining of an X-ray tube anode assembly. More particularly, it relates to the joining of a shaft (or stud) for an X-ray anode target to the hub of a rotor member, using a high-temperature brazing alloy.

A principal component of conventional X-ray equipment and computed tomography (CT) equipment is an X-ray tube which provides the source of X-rays. Such tubes contain a vacuum at $10^{-8}$ to $10^{-9}$ torr and operate by accelerating a stream of electrons from a heated cathode through a high voltage against a high melting point target anode. Since only about 1% of the electron energy is converted by this method into X-rays and the remaining 99% converted into heat, considerable heat is generated in the anode as a by-product of the generation of X-rays.

In order to reduce heat concentration in the anode, the anode is rotated at speeds up to 10,000 rpm thereby continuously presenting the cathode with a new and cooler surface. In a high performance X-ray tube, the surface of the anode may reach temperatures of 3200° C., and areas of the anode outside the immediate target surface may rise to temperatures of approximately 1300° C.

Rotor hub assemblies in X-ray tube anodes are often composed of refractory metal alloys, such as molybdenum, niobium, titanium, zirconium, and nickel. These metals and others are present in different amounts in different components of the assemblies. For example, a hub component may have the alloy metals present in certain amounts, a stud or rotor shaft in other amounts, and a fastening nut in still other amounts. The purpose of using different alloys is to afford a high rate of heat dissipation as well as achieve performance requirements. The joining of these components for the rotor hub assemblies presents a problem of precisely matching the thermal properties of a brazing alloy which serves as a filler material with those of the high-temperature refractory metal alloys to be joined. The brazed joint must not only overcome any mismatch in thermal properties of the component parts, but must also obtain a mechanical and thermal integrity of the assembly. It will be appreciated that the anode target weighs up to 5 pounds and, as previously stated, rotates at 10,000 rpm. The operating temperature of the anode can be up to 1000° C. at the stud/hub joint. In order to effect a reliable brazed joint under these conditions, the braze alloy must possess excellent high-temperature strength and ductility.

Brazing filler metals, which are commonly used in the industry for this type of application, include gold, silver and copper-based alloys. The problems with these filler materials under the conditions previously set forth are: Poor wetting and flow on some or all of the component materials being joined, leading to voids and other defects; low ductility, leading to cracking on cooling of the brazed joint, with very high stresses also created on the component piece parts, often leading to their cracking as well; formation of dispersed intermetallic brittle phases; and liquidus temperatures not much above 1000° C., thus limiting the operating temperature of the assembly during service.

SUMMARY OF THE INVENTION

This invention provides a method for braze joining a stud member of a rotating anode target to a hub portion of a rotor member for use in an X-ray tube anode. In this process, a metal alloy (the brazing alloy) is applied by means of heat at a common juncture of the shaft member and the hub portion. The metal brazing alloy is composed in weight percent: 30–70 copper, 10–55 palladium, and 5–28 nickel.

In one embodiment, the copper is present in an amount in the range of 50–60 wt.%, the palladium is present in an amount in the range of 40–45 wt.% and the nickel is present in an amount of 10–15 wt.%. The metal alloy is deposited at a temperature in the range of 1100° to 1200° C.

Preferably, the copper is present in an amount of about 50 wt.%, the palladium is present in an amount of about 40 wt.% and the nickel is present in an amount of about 10 wt.%. The metal alloy is deposited at a temperature of about 1185° C.

There is also provided an improved rotating X-ray target wherein a rotor shaft is fastened to a rotor hub wherein both the shaft member and the hub portion are composed of refractory metals. The fastening of the rotor shaft to the rotor hub is effected in part by a metal bonding composed of the previously described metal brazing alloy.

Also preferably, there is a threaded portion on the rotor shaft and a nut for fastening the shaft member to the hub portion, with the metal alloy filling in any voids in the threaded portion.

It is an object of this invention to provide a method for metal bonding a shaft member of an anode target to a hub portion of a rotor member in an X-ray tube anode wherein the resulting metal bonding has high-temperature strength and ductility.

It is another object of the present invention to provide a method for metal bonding components of an X-ray tube anode wherein the brazing alloy affords a high degree of wetting, as well as a high liquidus temperature.

Still another object is to provide an improved X-ray tube anode assembly wherein a shaft (stud) member of an anode target is secured to a hub portion of the rotor member resulting in an anode whose stud/hub joint can operate at temperatures above 1000° C.

Yet another object of this invention is to provide an improved X-ray tube anode assembly which, in addition to being threadably connected, also is metal bonded in the threaded area by the previously described metal brazing alloy.

These and other objects and advantages of the invention will be apparent from the following detailed description and drawing.

DESCRIPTION OF THE DRAWINGS

FIG. 1 shows a typical rotating anode X-ray tube with parts shown in section in which the new brazing alloy material of this invention is employed.

FIG. 2 is an assembly view showing the component parts which are to be brazed together with the brazing material of this invention.

FIG. 3 is an enlarged view in section showing the component parts in a brazed condition.

DESCRIPTION OF A PREFERRED EMBODIMENT

Figure 4:
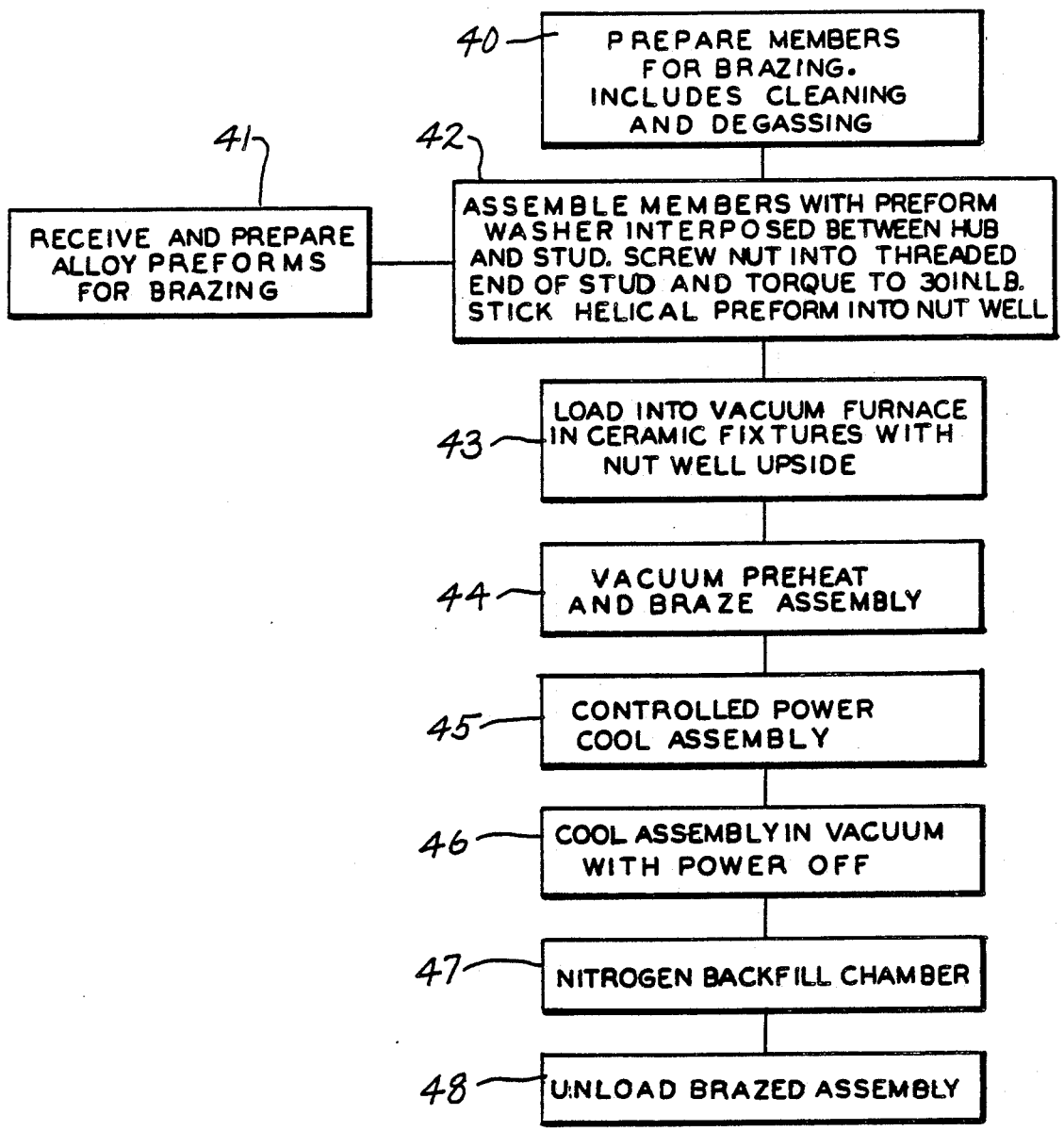
FIG. 4 is a flow chart illustrating the sequential steps in utilizing the brazing material of this invention.

In FIG. 1 there is shown a typical X-ray tube, generally 10. It will include a rotating hub 11 as well as a rotating shaft member 12 which are the component parts that are brazed together by the brazing material of this invention. There are the usual rotating target 14 on which an electron beam from the emissive filament 15 impinges. Conductors 17 and 18 supply the necessary voltage to the filament 15. The X-ray tube includes the usual glass envelope 20 as well as a rotor 22 which is secured such as by brazing to the hub portion 11. The rotor 22 is rotatably mounted in the glass envelope 20 by the bearing support 24. High voltage is supplied to the anode 14 through a supply line (not shown) coupled with a connector 26. Also omitted from the drawing are the stator coils for driving the rotor 22 (and hence the entire rotor assembly 11, 12, 14) as an induction motor.

Referring specifically to FIGS. 2 and 3, the brazing alloy material as utilized as a brazing material is in the form of two preforms. One is a washer as shown at 28, and the other is a helical preform as shown at 33. The composition of the novel brazing material as used in these preforms is composed of 50 weight percent copper, 40 weight percent palladium, and 10 weight percent nickel. The washer 28 is of a sufficient size to fit over the threaded section 31 of the stud member 12 and to abut against the larger diameter portion 35. In such instance, it will be sandwiched between the large diameter portion 35 and the hub 11 portion when the threaded section 31 is placed through the central opening 38 of the hub portion 11, and the nut 30 is subsequently engaged on the threads 31.

Referring to FIG. 4, there is shown a step-by-step procedure for utilizing the brazing composition of this invention in connecting the stud member 12 and the hub portion 11. As indicated in block 40, the hub portion 11 and the stud member 12 would be solvent cleaned and degassed at or above the brazing temperatures to remove all gases. As illustrated at block 41, the brazing composition would be formed into the preforms in the form of the washer 28 and the helical form as shown as 33. The washer 28 would be placed over the threaded section 31, and the threaded section 31 inserted through the opening 38 of the hub portion 11. The nut 30 would then be placed on the threaded section 31, and the nut 30 screwed onto the threaded section 31 until a torque of 30 inch pounds is accomplished. After this, the helical preform 33 would be placed in the nut well or cavity 37 as shown in FIG. 3.

Referring to block 43, the assembled hub portion 11 and stud member 12 as in FIG. 2 would be loaded into a vacuum furnace and on a ceramic fixture with the nut well or cavity 37 facing upwardly. A vacuum preheat and brazing step as stated at 44 would now be effected. This is accomplished by heating the furnace at 25° C. per minute up to a temperature of 600° C. A hold time of fifteen minutes is effected at the 600° C. temperature. The temperature is then increased at 25° C. per minute until 1000° C. is reached. At this stage the temperature is held for fifteen minutes. Subsequently, the temperature is increased 50° C. per minute until the temperature of 1100° C. is reached which temperature is held for five minutes. At this stage, the temperature is increased at 50° C. per minute until a maximum temperature of 1185° C. is accomplished which temperature is held for three minutes. Brazing of the components takes place at this temperature. After this brazing step, a cooling step is effected with controlled power which is indicated at 45. This cooling takes place at the rate of 15° C. per minute until the temperature is reduced to 1100° C. Subsequent cooling is effected at 8° C. per minute to 1000° C. In block 46 there is shown a vacuum cooling with the power shut off which takes place for a sufficient time until the part can be handled. Subsequently, and as indicated at block 47, there is a back filling of the chamber with nitrogen gas. The last step as indicated at 48 is to unload the completed brazed assembly.

Referring specifically to FIG. 3, the brazing material after it has been processed as previously described is shown in the form of stippling 29. The washer 28 will have melted and intermixed by diffusion with the adjacent alloys composing the stud 12 and the hub 11. It will later freeze and occupy the area shown at 27. The helical preform 33 also will have been melted and the brazing material distributed between the threads 31 of the stud member 12 or shaft and the threads 32 of the nut 30 as well as occupy any space between the stud 12 and the hub 11. Photomicrographs taken of the brazed assembly show that there are no second phase materials in the brazed joint, which is to say that the joint is a homogenous single phase microstructure which is free from dispersed intermetallic phases. Further, the absence of joint separation or cracking even on a microscopic level is further evidence that brazing alloy combines excellent wetting and a high liquidus temperature with high temperature strength and ductility. And, this is accomplished with component parts fabricated from high temperature materials which are of vastly different compositions.

The stud member 12 in this instance is composed of a metallic alloy known as TZM and is available from Metalwerk Plansee of Austria. The major portion of the alloy is molybdenum with minor amounts of titanium and zirconium as follows:

| Material | Weight % |
|---|---|
| Mo | 99.25 |
| Ti | 0.4–0.55 |
| Zr | 0.06–0.12 |

The hub portion 11 is composed of a metallic alloy known as Hastelloy $B_2$ and is available from Haynes International in Kokomo, Ind. The major portion of the alloy is nickel with minor amounts of molybdenum and iron as follows:

| Material | Weight % |
|---|---|
| Ni | Balance |
| Mo | 28.00 ± 2.0 |
| Fe | 2.00 max |

The nut 30 is composed of a metallic alloy known as Kovar and is available from Carpenter Technology. The major portion of the alloy is iron with minor amounts of nickel and cobolt as follows:

| Material | Weight % |
|---|---|
| Fe | 53.00 |
| Ni | 29.00 |
| Co | 17.00 |

With higher performance and temperature requirements being expected of X-ray tube components, the brazing alloy composition of this invention offers operating conditions as high as 1100° C. as compared with 900° C. of the previous X-ray tubes. All of this is accomplished by an alloy which can be applied in a minimum number of alloy preforms unlike prior art alloys used for this purpose.

While the brazing alloy of this invention has been presented in the form of a helix or washer, it will be appreciated that many forms of the material can be utilized such as a continuous wire, rod, thin flexible homogenous foil, powder form or even as a plating.

I claim:

1. An improved rotating X-ray target wherein a rotor stud member is fastened to a hub portion, wherein both the stud member and the hub portion are composed of refractory metals the improvement wherein said fastening of said rotor stud member to said hub portion comprises in part a metal bonding composed of a metal alloy including the following metals in the following ranges with the designated amounts expressed in terms of weight percent: 30–70 copper, 10–55 palladium; and 5–28 nickel.

2. The improvement of claim 1 wherein said copper is present in an amount by weight percent in the range of 50–60, said palladium is present in an amount by weight percent in the range of 40–45 and said nickel is present in an amount by weight percent of 10–15.

3. The improvement of claim 1 wherein said metal alloy comprises about 50 weight percent copper, about 40 weight percent palladium and about 10 weight percent nickel.

4. The improvement of claim 1 further including a threaded portion on said stud member and a nut for fastening said stud member to said hub portion.

5. The improvement of claim 4 wherein said rotor stud is composed with a major amount of molybdenum, said rotor hub is composed with a major amount of nickel and said nut is composed with a major amount of iron.

* * * * *